G. GOEWEY.
CORN SHELLER.
No. 37,662. Patented Feb. 10, 1863.
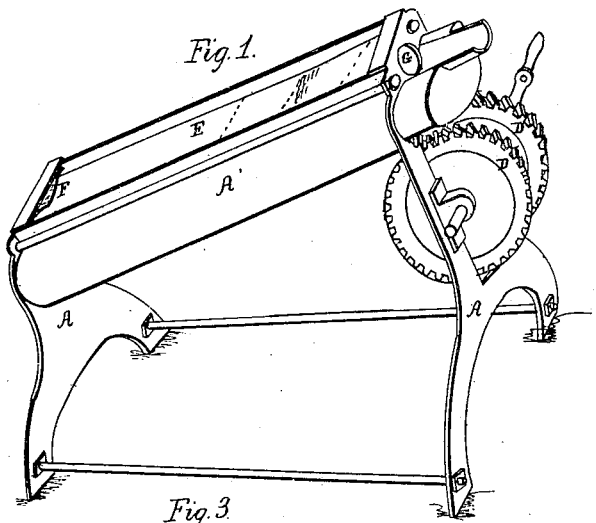
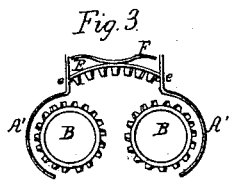
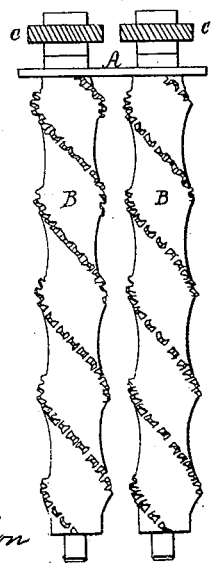
Witnesses.
J. E. Shaw
James McCahon
Inventor
George Goewey.

UNITED STATES PATENT OFFICE.

GEORGE GOEWEY, OF PHILADELPHIA, PENNSYLVANIA, ASSIGNOR TO HIMSELF AND WILLIAM BAILEY, OF SAME PLACE.

IMPROVEMENT IN CORN-SHELLERS.

Specification forming part of Letters Patent No. 37,662, dated February 10, 1863.

*To all whom it may concern:*

Be it known that I, GEORGE GOEWEY, of the city and county of Philadelphia, in the State of Pennsylvania, have invented a new and useful Machine for Shelling Indian Corn; and I do hereby declare that the following is a full, clear, and exact description of the construction and operation of the same, reference being had to the annexed drawings, making a part of this specification, in which—

Figure 1 is a perspective view of the machine; Fig. 2, a view of the rollers and pinion-wheels detached; Fig. 3, a transverse section showing a part of the frame, the rollers, and one of the springs; Fig. 4, an inside view of the concave, showing the arrangement of the teeth thereon; Fig. 5, a longitudinal vertical section of the concave, showing the rise in the latter, to facilitate the entry of the ears of corn into the machine.

A A', Figs. 1 and 3, represent the frame of the machine; B B, the two rollers employed, provided with teeth arranged spirally and with pinions C C, one on each. The rollers are set at an inclination, as shown in Fig. 1.

D D are driving-wheels on the same shaft, one for each pinion. The planes of the rollers and pinions are at right angles with the planes of the driving-wheels. The cogs on the latter, as well as the cogs on the pinions, are set diagonally, so as to give the rollers a motion on their axes at right angles with the planes of motion of the driving-wheels. The rollers have bearings in the ends of the frame. They are partly inclosed, being covered on the sides by the shell A', Fig. 3, forming part of the frame. They are covered on the top by the concave E, Figs. 1, 3, 4, and 5. The concave E is provided with spiral rows of teeth or cogs, corresponding to the teeth on the rollers B. Springs (one, F, of which is shown in Figs. 1 and 3) are applied at each end of the concave. The rollers B B have no vertical motion, but only a rotary motion on their axes. The springs F allow the concave to adjust itself to ears of different sizes, it being set for ears of small size. The concave is made with a slight rise or angle (shown in Fig. 5) at the end of it, near the mouth or feeding-place G of the machine, to facilitate the admission of the ears. It will be seen that the rollers B B both revolve in the same direction, the object and effect of which are to revolve the ears of corn, and at the same time force them against the teeth on the concave E, and carry the cobs out at the tail of the machine, the corn dropping under the rollers.

The machine may be made with the rollers set vertically; but in such case the corn and cobs will not be separated.

In a full sized machine the rollers, including the teeth, are about three inches in diameter and about one foot long. They are placed so that there shall be about three-eighths of an inch between the ends of the teeth on the two rollers.

The concave E is supported by lugs e at each end of the frame, two of the lugs being shown in Fig. 3. The lateral edges of the concave form a line above the middle longitudinal line of the rollers B B, and about one-eighth of an inch above the ends of the teeth on the rollers B B. The concave at its middle longitudinal line is about three-fourths of an inch above a line drawn over the upper surfaces of the rollers.

I construct the whole machine of cast-iron. The frame might be of wood; but such construction would increase its cost.

I make no claim to the employment of rollers, generally, for the purpose named; but What I do claim, and desire to secure by Letters Patent, is—

The employment of two rollers, B B, both revolving in one direction, and having two or more rows of teeth arranged spirally for the purpose of revolving the ears of corn, said rollers being used in combination with a concave, E, having teeth thereon arranged spirally, the teeth on the concave and the teeth on the rollers operating conjointly to shell the corn from the cob and pass the latter out at the tail of the machine.

GEORGE GOEWEY.

Witnesses:
J. E. SHAW,
JAMES McCAHEN.